(12) United States Patent
Zhihu

(10) Patent No.: US 12,048,262 B2
(45) Date of Patent: Jul. 30, 2024

(54) SAFE AUTONOMOUS AGRICULTURAL MACHINE

(71) Applicant: ZF Friedrichshafen AG, Friedrichshafen (DE)

(72) Inventor: Chen Zhihu, Constance (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 460 days.

(21) Appl. No.: 17/430,757

(22) PCT Filed: Feb. 10, 2020

(86) PCT No.: PCT/EP2020/053239
§ 371 (c)(1),
(2) Date: Aug. 13, 2021

(87) PCT Pub. No.: WO2020/165061
PCT Pub. Date: Aug. 20, 2020

(65) Prior Publication Data
US 2022/0159897 A1 May 26, 2022

(30) Foreign Application Priority Data
Feb. 15, 2019 (DE) .................... 10 2019 202 040.2

(51) Int. Cl.
A01B 69/04 (2006.01)
G01S 13/75 (2006.01)
(Continued)

(52) U.S. Cl.
CPC ............ A01B 69/008 (2013.01); G01S 13/75 (2013.01); G01S 13/876 (2013.01); G01S 17/74 (2013.01);
(Continued)

(58) Field of Classification Search
CPC ....... A01B 69/008; A01B 69/02; G01S 13/75; G01S 13/876; G01S 17/74; G05D 1/0214;
(Continued)

(56) References Cited

U.S. PATENT DOCUMENTS 6,141,614 A * 10/2000 Janzen ................ A01B 79/005
701/410
6,236,907 B1 * 5/2001 Hauwiller ............ A01B 79/005
701/50
(Continued)

FOREIGN PATENT DOCUMENTS

DE 3888732 T2 8/1994
DE 10307794 A1 9/2004
(Continued)

Primary Examiner — Donald J Wallace
Assistant Examiner — Jalal C Coduroglu
(74) Attorney, Agent, or Firm — LEYDIG, VOIT & MAYER, LTD.

(57) ABSTRACT

A system includes a series of converters provided along a boundary of an agricultural cultivated area. A converter is configured to emit a second signal in response to an incoming first signal. The system also includes an autonomously driving agricultural machine including a transmitting device configured to emit the first signal in an environment of the agricultural machine, a receiving device configured to receive the second signal emitted in response to the first signal, and a processing device configured to determine a position of the agricultural machine with respect to the boundary based on the received second signal. An arrangement and/or a conversion characteristic of converters is designed differently at a first section of the boundary than at a second section of the boundary.

11 Claims, 5 Drawing Sheets

(51) Int. Cl.
*G01S 13/87* (2006.01)
*G01S 17/74* (2006.01)
*G05D 1/00* (2024.01)

(52) U.S. Cl.
CPC ......... *G05D 1/0214* (2013.01); *G05D 1/0257* (2013.01); *G05D 1/0265* (2013.01)

(58) Field of Classification Search
CPC ............... G05D 1/0257; G05D 1/0265; G05D 2201/0201
See application file for complete search history.

(56) References Cited

U.S. PATENT DOCUMENTS

| | | | |
|---|---|---|---|
| 6,336,066 B1 * | 1/2002 | Pellenc | A01B 79/005 172/6 |
| 2005/0149235 A1 * | 7/2005 | Seal | A01B 79/005 382/110 |
| 2013/0192183 A1 | 8/2013 | Choi et al. | |
| 2014/0060949 A1 * | 3/2014 | Anderson | G01S 1/022 903/902 |
| 2015/0005970 A1 * | 1/2015 | Zweigle | H02J 3/242 700/286 |
| 2016/0063420 A1 * | 3/2016 | Tomii | G06Q 10/06314 705/7.24 |
| 2016/0113195 A1 | 4/2016 | Das et al. | |
| 2017/0131718 A1 * | 5/2017 | Matsumura | G05D 1/02 |
| 2017/0177002 A1 * | 6/2017 | Ogura | G05D 1/0295 |
| 2018/0153084 A1 * | 6/2018 | Calleija | A01B 79/005 |
| 2018/0206391 A1 * | 7/2018 | Shinkai | G05D 1/0268 |
| 2018/0210449 A1 * | 7/2018 | Sakaguchi | G05D 1/0219 |
| 2019/0064835 A1 * | 2/2019 | Hoofard | B60T 7/22 |
| 2019/0150357 A1 * | 5/2019 | Wu | H04N 7/188 |
| 2019/0154439 A1 * | 5/2019 | Binder | G01B 11/26 |
| 2019/0227561 A1 * | 7/2019 | Hiramatsu | G05D 1/027 |
| 2019/0259108 A1 * | 8/2019 | Bongartz | G06Q 10/0639 |
| 2019/0267807 A1 * | 8/2019 | Zweigle | G05B 13/048 |
| 2019/0332117 A1 * | 10/2019 | Vasquez-Govea | G05D 1/0236 |
| 2020/0011998 A1 * | 1/2020 | Koyama | G01S 7/4817 |
| 2020/0025923 A1 * | 1/2020 | Eichenholz | G01S 17/931 |
| 2020/0134741 A1 * | 4/2020 | Bongartz | G06Q 50/02 |

FOREIGN PATENT DOCUMENTS

| | | |
|---|---|---|
| DE | 102007027648 A1 | 12/2008 |
| DE | 102015218225 A1 | 4/2016 |

* cited by examiner

SAFE AUTONOMOUS AGRICULTURAL MACHINE

CROSS REFERENCE TO RELATED APPLICATIONS

This application is a U.S. National Phase application under 35 U.S.C. § 371 of International Application No. PCT/EP2020/053239, filed on Feb. 10, 2020, and claims benefit to German Patent Application No. DE 10 2019 202 040.2, filed on Feb. 15, 2019. The International Application was published in German on Aug. 20, 2020 as WO 2020/165061 A1 under PCT Article 21(2).

FIELD

The present disclosure relates to an autonomous agricultural device. In particular, the disclosure relates to the control of an autonomously drivable agricultural machine.

BACKGROUND

In modern farming, autonomously driving agricultural machines are used to sow, maintain or harvest plants. For example, an automatic combine can harvest a cereal field grain autonomously. In doing so, it steers automatically and travels exactly along a cut edge of the cereal. An autonomous tractor can accompany the combine and continuously receive harvested cereal in a trailer.

Unlike an autonomous motor vehicle in public road traffic, an autonomous agricultural machine typically does not have to expect other vehicles or road users, and traffic rules are also usually not relevant. On the other hand, obstacles may occur, such as a trench, a pothole or a hillside, which does not have to be expected in public road traffic. Moreover, the agricultural machine must be controlled as a function of an agricultural function, which relates, for example, to the working of plants being cultivated. It is to be ensured that the autonomous agricultural machine does not readily leave a predetermined agricultural cultivated area.

In order to ensure this, an absolute position of the agricultural machine is usually determined and compared to a predetermined geographical region in which it is to operate ("geofencing"). If there is a risk of the agricultural machine leaving the region, it can be diverted or stopped. The reliability of this approach is primarily dependent on a correct position determination. If a global navigation satellite system (GNSS) is used for this purpose, disruptions or systematic errors can lead to an incorrectly determined position. Under certain conditions, for example when a signal path is shaded, the position determination can fail completely.

SUMMARY

In an embodiment, the present disclosure provides a system. The system includes a series of converters provided along a boundary of an agricultural cultivated area. A converter is configured to emit a second signal in response to an incoming first signal. The system also includes an autonomously driving agricultural machine including a transmitting device configured to emit the first signal in an environment of the agricultural machine, a receiving device configured to receive the second signal emitted in response to the first signal, and a processing device configured to determine a position of the agricultural machine with respect to the boundary based on the received second signal. An arrangement and/or a conversion characteristic of converters is designed differently at a first section of the boundary than at a second section of the boundary.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
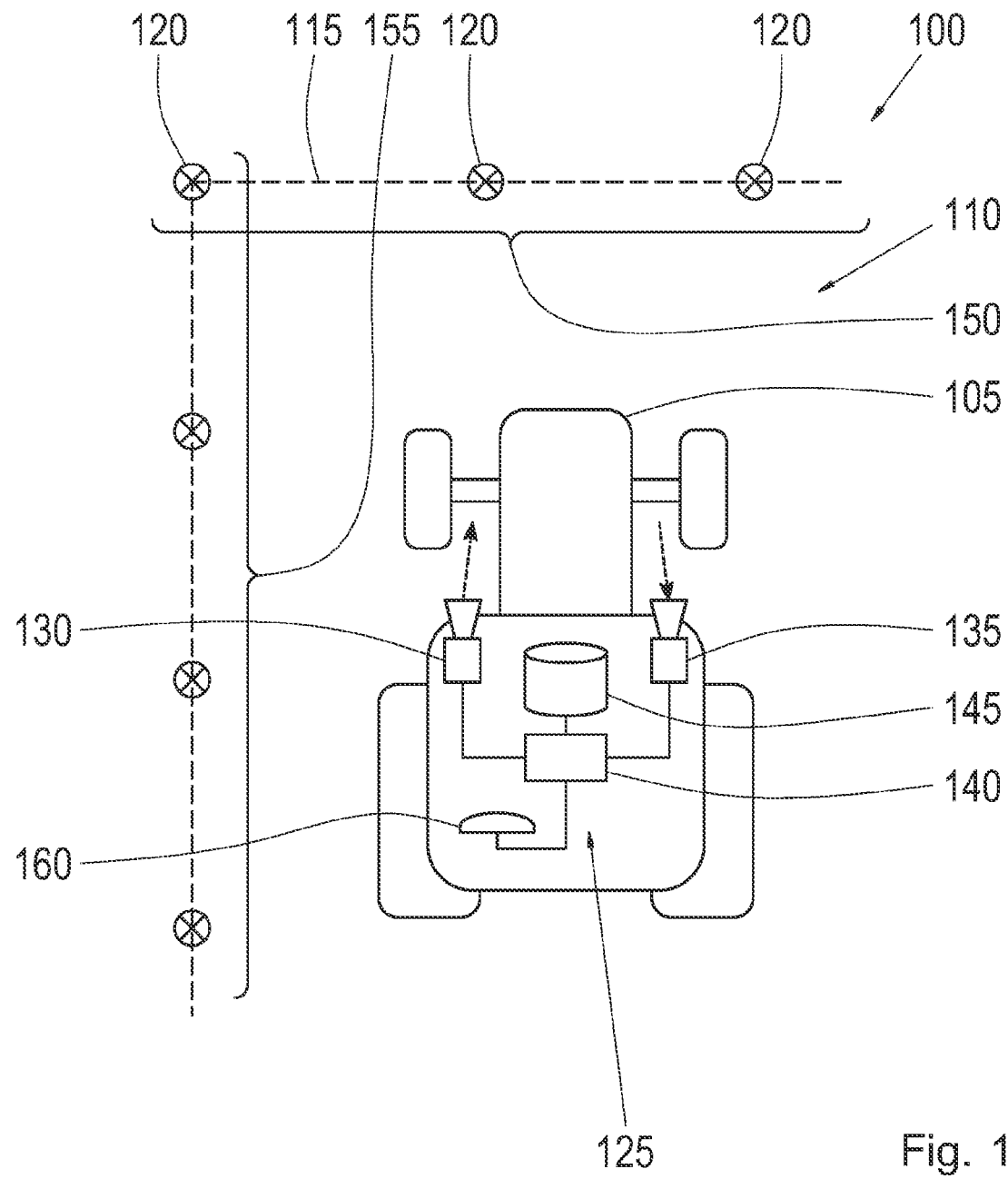
FIG. 1. shows an exemplary system including an autonomously drivable agricultural machine on a cultivated area.

The present disclosure provides improved technology for safely operating an autonomously drivable agricultural machine.

According to a first aspect of the disclosure, a system comprises an autonomously driving agricultural machine and a series of converters, which are provided along a boundary of an agricultural cultivated area. A converter is configured to emit a second signal in response to an incoming first signal. The autonomously driving agricultural machine comprises a transmitting device for emitting the first signal in an environment of the agricultural machine, a receiving device for receiving the second signal emitted in response to the first signal and a processing device configured to determine a position of the agricultural machine with respect to the boundary based on the received second signal. An arrangement and/or a conversion characteristic of converters are designed differently at a first section of the boundary than at a second section of the boundary.

The agricultural machine approaching the boundary generally represents information from which the position of the agricultural machine cannot yet be unambiguously determined. In conventional systems, the converters are usually designed to be uniform and arranged equidistantly, so that they do not allow any further information about the position of the agricultural machine. By way of the selected arrangement and/or conversion characteristic, additional Information can be provided beyond the existence of the converter in a scanning range. Different sections of the boundary may thereby be distinguishable. The agricultural machine can also be controlled as a function of a certain section. For example, a particular location of the boundary can be marked, such as a starting point or an end point for autonomous driving. When approaching the starting or end point, the agricultural machine can, for example, stop, but change its course when approaching the remainder of the boundary.

The system does not depend on receiving signals from a satellite-based navigation system, such as GPS, GLONASS or GALILEO. Even under difficult reception conditions for satellite signals, the converters can ensure that the agricultural machine does not leave the cultivated area. The safety of the agricultural machine, of an environment of the cultivated area, of a person or of an object outside the cultivated area can thereby be improved. The additional position information provided by the arrangement and/or design of the converter can be used for a first approximation of the position or merged with other information, in order to determine the position of the agricultural machine more precisely or reliably. The agricultural machine can react differently to the boundary in the different sections.

The conversion characteristic preferably relates to the strength of the second signal in relation to the first signal. If the converter is a reflector, it can have a predetermined shape or size, in order to correspondingly emit the second signal more strongly or less strongly. If the converter is a transponder, it can also change a frequency, a modulation or a message impressed on the second signal, in order to provide characteristic information assigned to the converter. An assignment between a converter and its position can be known by the agricultural machine.

The conversion characteristic may be dependent on the type of the first signal. For example, a converter may convert visible light, infrared light and radar signals differently into a second signal. Other types of signals are also possible. For n different types of the first signal, an equal number of second signals can be emitted, and thus up to $2^n$ converters can be distinguished from each other. For this purpose, the converter can also be a combination of several individual converters, each of which is assigned to a type of the first signal.

The arrangement can relate to a distance of one converter from an adjacent converter. For example, a distance between respectively adjacent converters along the boundary can increase strictly monotonically, so that a certain distance between two converters can indicate a position along the boundary. This determination is already possible if the distances between adjacent converters are different from one another in pairs. A succession of distances along the boundary can be arbitrarily selected.

The arrangement can also relate to a vertical height of a converter, in particular in relation to a defined height or a ground. A predetermined position of a converter can be assigned to a height, so that the position of the agricultural machine can already be determined by determining the height of a single converter.

In yet another embodiment, multiple converters are arranged to be vertically offset at at least one location along the boundary. This variant can be easily combined with other variants described herein. A horizontal position of the converters can be better determined by combining the information provided by the vertically offset converters.

The first signal preferably includes an electromagnetic wave. The wave can be in a predetermined frequency range and, for example, include visible light, infrared light or a radar signal. In a first variant, the converter is designed as a reflector, and the second signal essentially corresponds to the first. The reflector can have a simple, robust and cost-effective design and may not require a dedicated power supply. In a second variant, the first and second signals include electromagnetic waves that are different from one another, and the converter is designed as a transponder. For example, the converter can be implemented by means of RFID or NFC technology. The converter can have a dedicated power supply or can be supplied from energy of the first signal. It is particularly preferred that the second signal carries a unique identification of the transponder. Identifications of the converters can each be assigned a position so that, knowing its identification, the position of the converter can be determined.

According to a second aspect of the disclosure, a method for determining a position of an agricultural machine with respect to a boundary of an agricultural cultivated area is provided. A series of converters are provided along the boundary, wherein a converter is configured to transmit a second signal in response to an incoming first signal. The method preferably comprises steps of emitting at least one first signal in an environment of the agricultural machine; receiving at least one second signal emitted in response to the at least one first signal; and determining the position based on the at least one received second signal.

The method can in particular be carried out on board an agricultural machine described herein. It should be noted that, in a first variant, only a first signal is emitted, in the response of which no, one or more second signals can be received. In a second variant, multiple first signals are emitted, in the response of which likewise no, one or more second signals can be received.

According to a third aspect of the disclosure, a control device for an agricultural machine, which is configured for autonomous driving on an agricultural cultivate area, comprises a transmitting device for emitting at least one first signal in an environment of the agricultural machine; a receiving device for receiving multiple second signals that have been emitted in response to the at least one first signal; a memory device for storing positions of converters of the first signal in the second signal along the boundary of the cultivated area; and a processing device. The processing device is configured to determine a position of the agricultural machine with respect to the boundary based on one or more received second signals.

Information that can be collected by the reception (or absent reception) of one or more second signals via a converter can preferably be mapped to a position of the converter in question by means of assignments stored in the memory device.

The processing device can be configured to execute all or part of a method described herein. For this purpose, the processing device can comprise a programmable microcomputer or microcontroller, and the method can be present in the form of a computer program product having program code means. The computer program product can also be stored on a computer-readable data carrier. Features or advantages of the method can be transmitted to the device or the system, or vice versa.

According to yet another aspect of the disclosure, an agricultural machine comprises a control device described herein. The agricultural machine is preferably configured to determine an impending crossing of the boundary based on its determined position. Thereupon, a corresponding warning signal can be provided. In further embodiments, the crossing can be allowed or prevented.

FIG. 1 shows an exemplary system 100 including an autonomously drivable agricultural machine 105 on an agricultural cultivated area 110. The agricultural machine 105 can in particular comprise an automatic working machine, a tractor or a transport vehicle. The cultivated area 110 has a boundary 115, which is preferably closed and rectangular, but can also be of any other shape. An agricultural product is usually assigned to a cultivated area 110, which can be virtually any plants that can be cultivated, for example cereal, beets, lettuce, corn, berries or fruit. The product or a property of the product can influence how the agricultural machine 105 is to be controlled on the cultivated area 110.

In any case, the agricultural machine 105 must be prevented from inadvertently leaving the cultivated area.

Converters 120 are distributed along the boundary 115, wherein it is preferred that distances between respectively adjacent converters 120 in each case maintain a predetermined maximum distance. A control device 125 is provided on board the agricultural machine 105, which comprises a transmitting device 130, a receiving device 135 and a processing device 140. In addition, a memory device 145 and/or a positioning unit 160 can be provided.

The control device 125 is configured to emit a first signal, which can in particular include an electromagnetic wave, by means of the transmitting device 130. The first signal can be emitted at least partially in the direction of travel of the agricultural machine 105. If the first signal impinges on one of the converters 120, the converter can, in response thereto, emit a second signal, which can be received by means of the receiving device 135 of the control device 125. In the process, a type, direction or strength of the second signal with respect to the first signal and/or a direction of the second signal with respect to the agricultural machine 125 or its direction of travel can be determined. The direction can be determined in the horizontal and/or vertical direction. The second signal can carry information, in particular a modulated message, which can also be evaluated.

The maximum distance between adjacent converters 120 can be selected as a function of a transmission characteristic of the transmitting device 130 and/or a reception characteristic of the receiving device 135. The maximum distance can be determined, for example, as a function of an emission angle of the transmitting device 130 or of a reception angle of the receiving device 135 in such a way that a predetermined number of converters 120 for the control device 125 always can be detected when the boundary 115 is crossed.

The processing device 140 is preferably configured to detect a converter 120 in the region of the agricultural machine 105 based on the first and the second signals. Based on the detected converter 120, the agricultural machine 105 can better determine its own position. The position determination can be used, for example, for adjusting or improving an odometer, an inertial system or another position determination. If the agricultural machine 105 is about to cross the boundary 115, a corresponding signal can be output.

It is preferred that different sections of the boundary 115 can be distinguished from one another by the control device 125 based on different characteristics of the converters 120. For example, the converters 120 can be designed as reflectors and can be smaller on a first section 150 and larger on a second section 155. A ratio between the first and second signals can then be greater in the region of the first section 150 and smaller in the region of the second section 155 when the first signal is reflected at a converter 120. In a further embodiment, a converter 120 is configured to transmit its second signal at different strengths in different directions. As a result, it can be determined, for example, which side of a boundary 115 the agricultural machine 105 is located on.

FIG. 2 shows various exemplary types of encoding position information in converters 120, wherein the described types can also be partially or completely combined with one another.

Figure 2A:
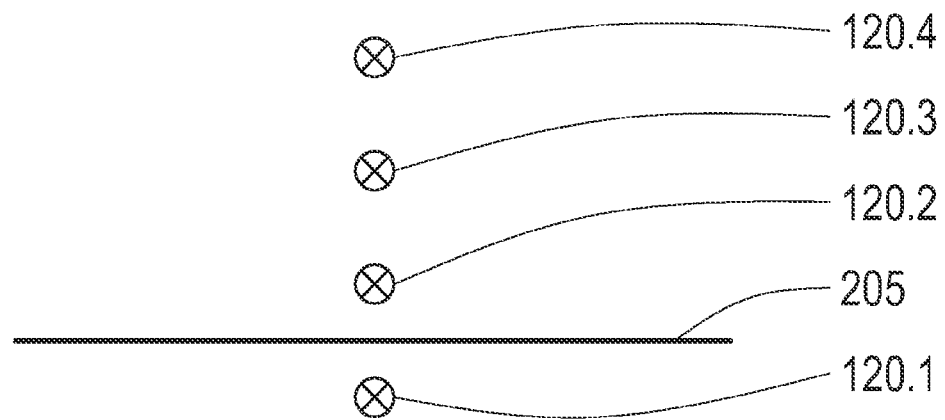
FIGS. 2*a* through 2*c* show various exemplary types of encoding position information into converters.

FIG. 2a shows a first variant in which multiple converters 120 are arranged at the same horizontal position. The converters 120 are able to receive different first signals. The signal types mentioned hereafter are purely exemplary.

A first converter 120.1 is buried in a ground 205 and configured to convert radar signals. For this purpose, a radar frequency in the microwave band can in particular be used for the first signal, which penetrate the first signal into the ground 205 to a predetermined depth at which the first converter 120.1 is maximally located.

A second converter 120.2 is configured to react to light in the visible range. For example, an optical filter can be used to limit a sensitive region of the converter 120.2 to visible light. In a further embodiment, the converter 120.1 can also be limited to a predetermined color, for example red or blue, which are at far ends of the visible light spectrum.

A third converter 120.3 is configured to react to light in the infrared range. A fourth converter 120.4 is designed to respond to laser light of a predetermined wavelength. The second signal can only be provided if the first signal has a predetermined coherence and/or does not exceed a predetermined bandwidth.

Each of the converters 120 responds to a different first signal and preferably also provides second signals that can be distinguished from one another. Different combinations of the converters 120 can be provided at different positions along the boundary 115. If a converter 120 provided, or not provided, at a horizontal position in the manner of the binary system, $2^4=16$ different combinations can be formed when using four different converters 120, which can be implemented at different positions. When a combination of converters 120 is excited at a position (simultaneously or consecutively) with all provided first signals, it is possible to determine which combination this is, based on detected or absent second signals. A position can be assigned to the combination, so that the position of the agricultural machine 105 can be better determined. Certain limitations may apply to combinations used, for example combination 0 (absent second signals from all converters 120) can be excluded; which also indicates a location at which no converter 120 is provided at all, for example at some distance from the boundary 115. It may also be required for a certain number of converters 120 to be provided at each horizontal position, for example at least two or three.

In an additional variant, it is also possible to determine which vertical height the individual converters 120 are located at. If three vertical heights that can be distinguished from one another are assumed, the three above-ground converters 120 can be provided in $3!=6$ combinations, which can be distinguished from one another based on their second signals.

Figure 2B:
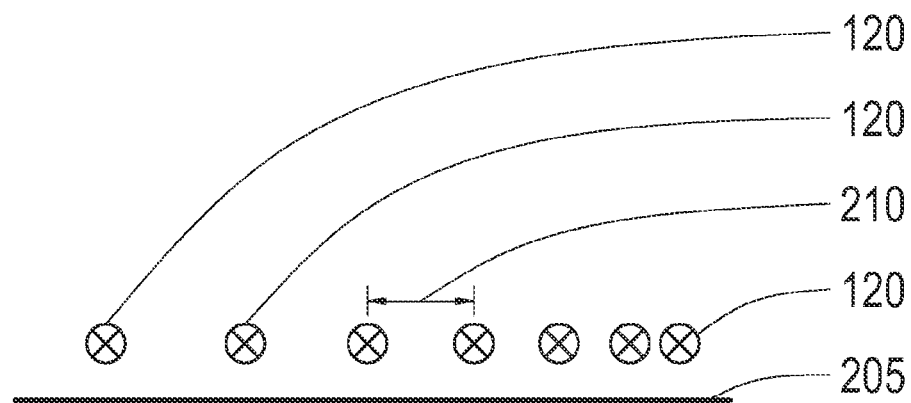
Figure 2C:
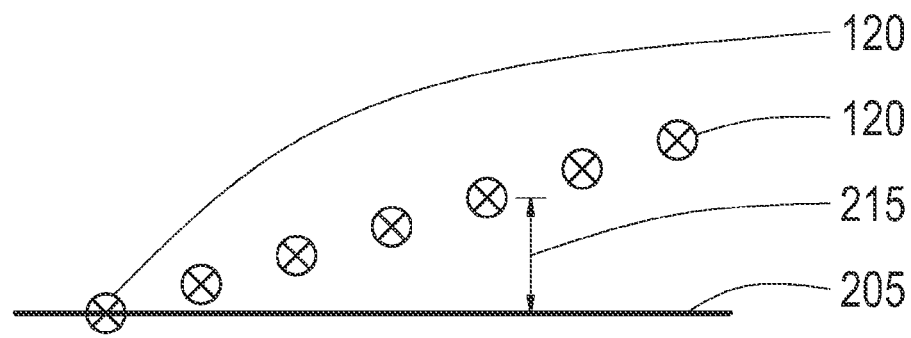

FIG. 2b shows a second variant, with which distances 210 between adjacent converters 120 are varied as a function of the location. In the illustrated embodiment, relative distances decrease strictly monotonically from left to right. A position along the boundary 115 can be assigned to a distance. FIG. 2c shows a third variant, with which a height 215 of the converters 120 above the ground 120 is varied. In the present case, the height 215 increases strictly monotonically from left to right. In the variants of FIGS. 2b and 2c, there need not be a monotonic sequence of the distances 210, 215; rather, a position can be assigned to a distance 210, 215 and consecutive distances 210, 215 can be arbitrarily selected, even randomly if necessary.

Figure 3:
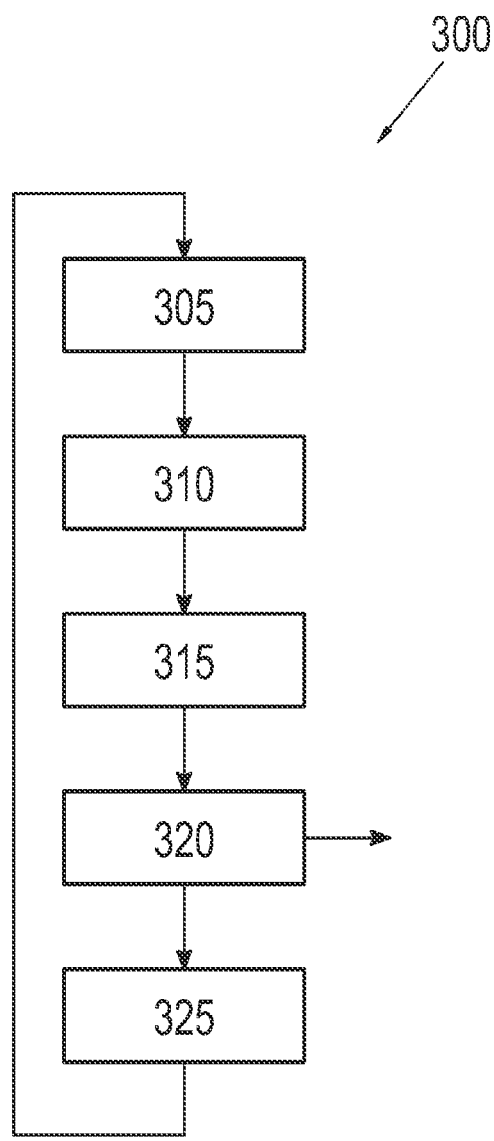
FIG. 3 shows a flow chart of an exemplary method.

FIG. 3 shows a flow chart of a method 300. The method 300 can in particular be executed by means of the control device 125 and can be used for the position determination and/or for the control of the agricultural machine 105.

In a step 305, a first signal can be emitted in the region of the agricultural machine 105. In a subsequent or simultaneously executed step 310, a second signal can be received, which was emitted by a converter 120 in response to the first signal. In different embodiments, multiple first signals can be emitted consecutively or simultaneously and/or multiple second signals can be received consecutively or simultaneously. In some embodiments, the absence of a second signal can also be determined in response to an emitted first signal.

In a step 315, a strength, a horizontal direction (azimuth), a vertical direction (elevation), a modulation and/or transported information can be determined for a second signal. Signal properties influenced by the converter 120 can indicate a conversion characteristic of the converter 120. Directional information of the second signal can indicate an arrangement of the converter 120 along the boundary 115.

In a step 320, a position of the agricultural machine 105 can be determined based on the determined information. For this purpose, it can be determined which combination of converters 120 is located in a detection range of the devices 130, 135, and a position assigned to the combination can be determined. A combination of certain characteristics of a second signal can also be assigned to a position of a converter 120 and can be determined, for example, by looking it up in the memory device 145.

The information determined based on the at least one second signal (or its absence) can also be provided externally, for example so as to compare, merge or verify it with other information, for example in order to determine the position of the agricultural machine 105.

In a step 325, it can be determined whether the agricultural machine 105 is about to cross the boundary 115. This can in particular be the case when its course and its speed would take it over the boundary 115 within a predetermined time. A maneuver of the agricultural machine 105 planned before the expected crossing, in particular with regard to a change in direction or speed, can be taken into account in the determination. The predetermined time can be selected as a function of a maximum detection distance of the devices 130, 135. This distance is usually a few meters, for example approximately 20 m, approximately 10 m or approximately 5 m.

If the agricultural vehicle 105 is about to cross the boundary 115, a corresponding signal can be output. The signal can be transmitted to a unit that controls a movement of the agricultural machine 105. The signal can also be output to a person, for example haptically, acoustically or visually. Furthermore, the signal can directly force a speed reduction and/or an evasive maneuver of the agricultural machine 105.

The method 300 is preferably run through continuously, while the agricultural vehicle 105 drives autonomously on the cultivated area 110.

Figure 4:
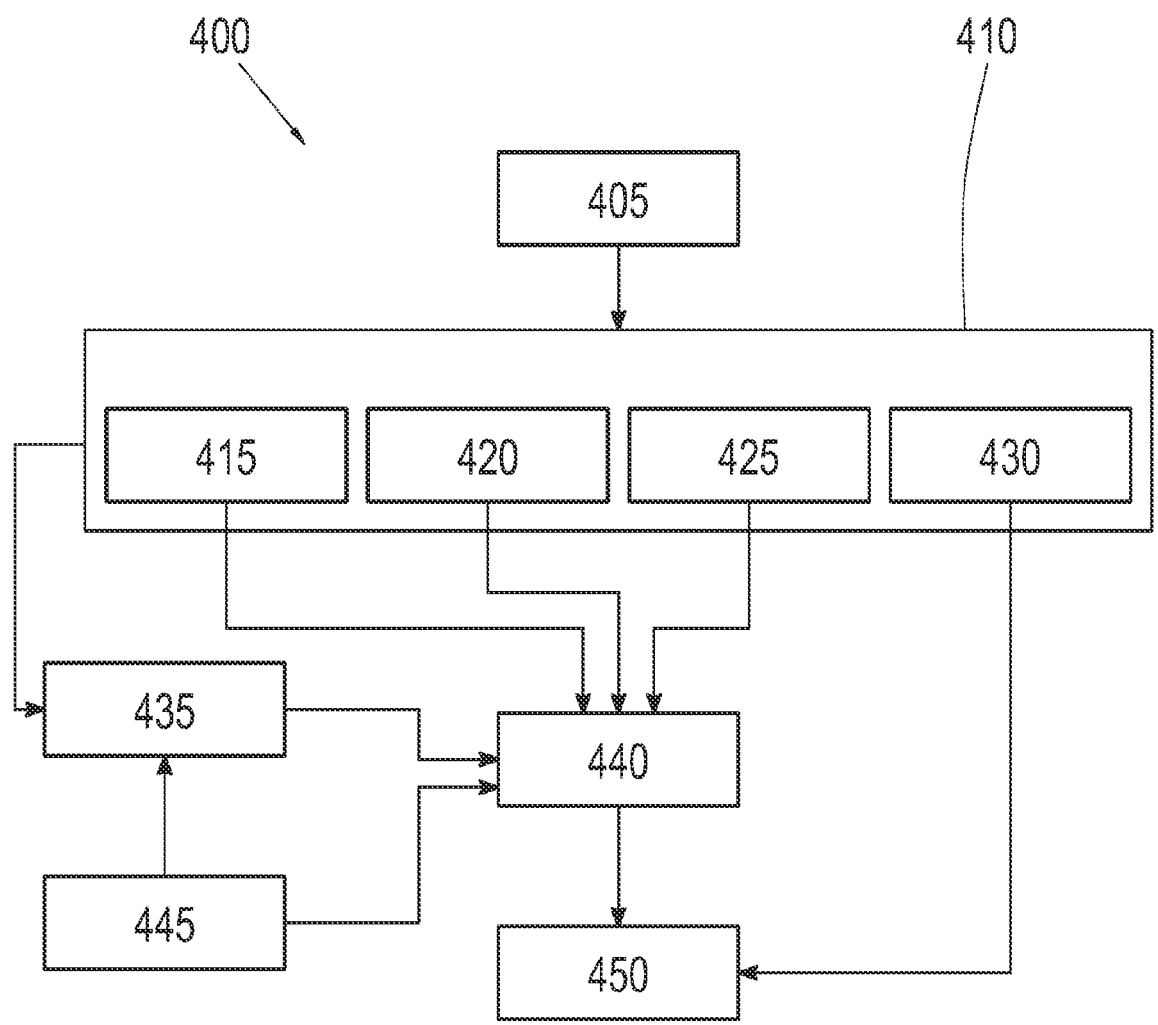
FIG. 4 shows a schematic representation of an exemplary processing system on board an autonomously drivable agricultural machine.

FIG. 4 shows a schematic representation of a processing system 400 on board an autonomously drivable agricultural machine 105. The processing system 400 is configured for use on board the agricultural machine 105 and can complement or comprise the control device 125. The representation of FIG. 4 can also be understood as a flowchart of a corresponding processing method. Individual function blocks can be combined or integrated with one another.

The processing system 400 comprises one or more sensors 405, wherein one of the sensors 405 preferably comprises a receiving device 135, more preferably including an associated transmitting device 130. Values provided by the sensors 405 can be processed by means of a detection device 410, which encompasses at least one of a conversion detection 415 (see the processing device 140), a path recognition 420, a SLAM determination 425 and an obstacle recognition 430.

The conversion detection 410 preferably executes the determination of information, which can be determined from a second signal received in response to an emitted first signal. The path recognition 420 preferably determines a path on which the agricultural machine 105 usually moves on the cultivated area 110. As a rule, the agricultural machine 105 follows the cultivated area 110 on a course that takes the agricultural machine—as economically as possible—past all cultivated plants. The course is often a meander, in particular when the plants are relatively small compared to the agricultural machine 105. If the path is negotiated several times by the agricultural machine 105, for example two or three times a year, the ground 205 can become compressed in this region, so that it can be visually recognized. If the agricultural machine 105 is to follow the path again, an attempt can be made to use the path previously traveled for reference.

The SLAM determination 425 preferably carries out a position determination with simultaneous mapping ("Simultaneous Localization and Matching"). In one embodiment, detected landmarks whose positions or configurations are known are evaluated. The obstacle recognition 430 can be carried out concurrently with the other determinations 415-425, in order to be able to determine at any time, to the extent possible, whether the agricultural machine 105 is about to run into an obstacle. The obstacle can, for example, encompass a large rock, a swampy section, a well, a fence, a building, a power pole, a parked device or a person. The collision with the obstacle can be avoided so as to avoid damage to the agricultural machine 105 or damage to the obstacle. Different obstacles can be handled differently.

The detecting device 410 can be configured to determine a position of the agricultural machine 105. An odometry device 415 is preferably configured to determine a position of the agricultural machine 105 based on a path it has traveled. The path can be determined, for example, by means of a rotation rate sensor via a rotational movement of a wheel of the agricultural machine 105 or by means of an inertial system based on an acceleration curve over time. A position determined by means of the detection device 410 can be used for adjusting the odometry device 435.

Determinations of the devices 415-425 can be combined with information from the odometry device 435 in a merging step 440, in order to ultimately determine the position of the agricultural machine 105. For this purpose, an absolute geographical position that was determined by means of a GNSS receiver 445 can preferably also be taken into account. The position determined by means of the GNSS receiver 445 can also be used to adjust the odometry device 435. However, it shall be noted that this position may not be reliably or continuously available in some circumstances.

Based on the determined position, a movement control unit 450 can control a movement of the agricultural machine 105. The movement control unit 450 can influence a longitudinal and/or transverse control and is preferably configured to control the agricultural machine 105 along a predetermined path, which is further preferably predetermined as a function of a negotiated cultivated area 110. Based on a determination of the collision avoidance 430, the movement can be controlled in such a way that a collision with an obstacle is avoided.

Figure 5:
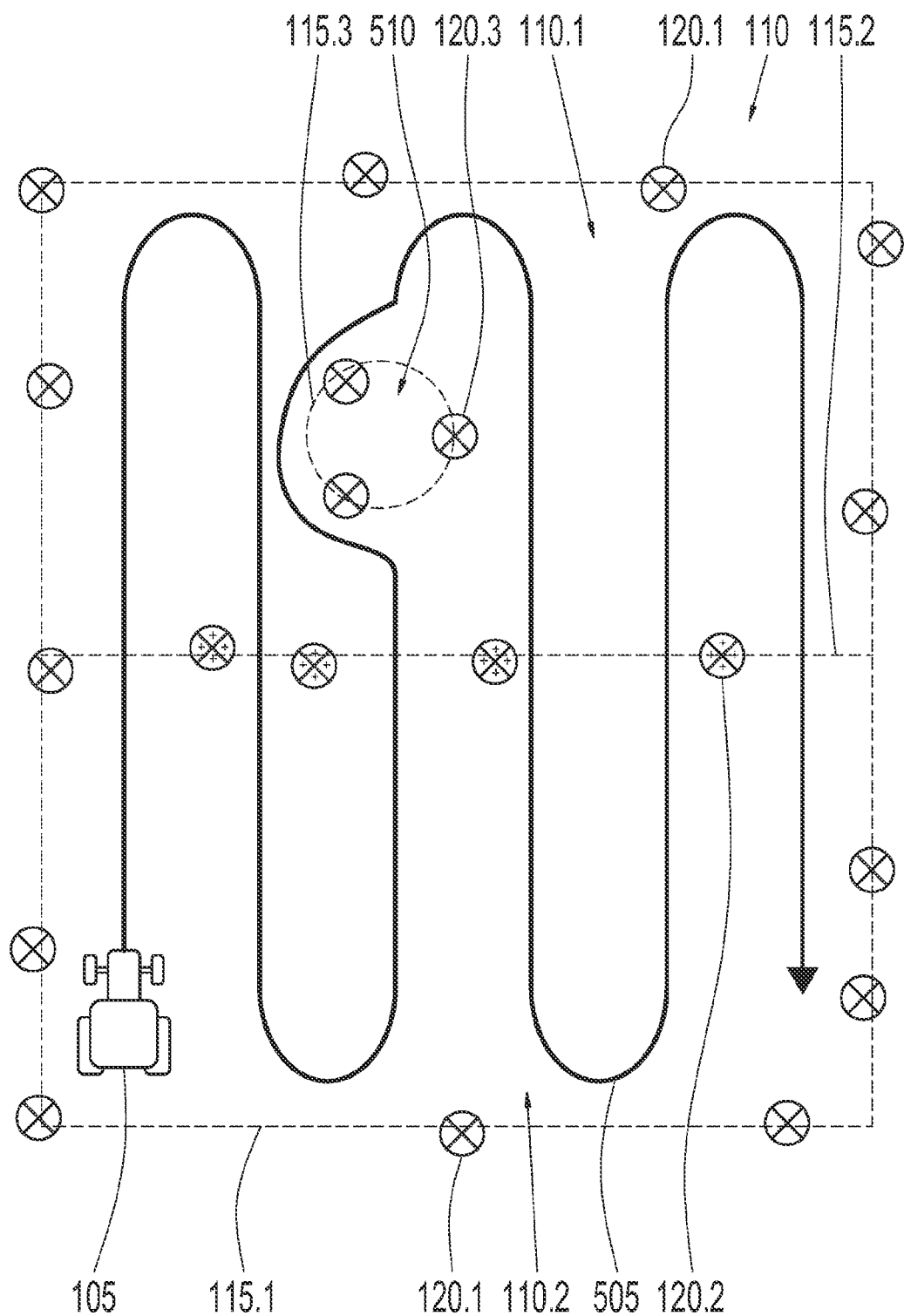
FIG. 5 shows a visualization of exemplary applications of a system.

FIG. 5 shows a visualization of exemplary applications of a system 100, based on the system 100 of FIG. 1. The agricultural machine 105 is located on a cultivated area 110 comprising two mutually abutting cultivated areas 110.1 and 110.2. An outer boundary 115.1 of the cultivated area 110 is marked with a series of first converters 120.1, and an inner boundary 115.2 between the cultivated areas 110.1 and 110.3 is marked with a series of second converters 120.2. The converters 115.1 and 115.2 differ in any arbitrary way, which can be determined based on a second signal received by them in response to an emitted first signal. The selected designations 120.1-120.3 do not necessarily correspond to those of FIG. 2.

The agricultural machine 105 can continuously work the entire cultivated area 110 by following a predetermined path 405, which here is a meandering path by way of example. The control device 125 mounted on board the agricultural machine 105 can be configured not to cross the first boundary 115.1, but to disregard the second boundary 115.2 for the work to be performed.

In a second application shown in FIG. 5, a known obstacle 510 is located on the cultivated area 110. The obstacle 510 can be permanent and, for example, can encompass a building or a power pole, or can be temporary and, for example, relate to a meadow or a storage location. In order to prevent the agricultural machine 105 from driving over the obstacle 510, a series of further converters 120.3 can be provided along a boundary 115.3 surrounding the obstacle 510. The control device 125 can be configured to prevent the boundary 115.3 from being crossed by the agricultural machine 105 in a manner described herein. As is explained in more detail above, the converters 120.3 can be configured to be distinguished from other converters 120 based on second signals that they emit in response to first signals.

As is indicated in FIG. 5, positioning of the converters 120 is usually not subject to high precision requirements. For practical purposes, the boundary 115 defined by the converters 120 can deviate by an amount from the predetermined boundary 115, which can be in the range of approximately 1 m. The accuracy of a positioning of the agricultural machine 105 with respect to the converters 120 can primarily depend on the accuracy of provided position information about the converters 120.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

100 System
105 Agricultural machine
110 Cultivated area
115 Boundary
120 Converter
125 Control device
130 Transmitting device
135 Receiving device
140 Processing device
145 Memory device
150 First section
155 Second section
160 Positioning device
205 Ground
210 Horizontal distance
215 Height
300 Method
305 Emitting first signal
310 Receiving second signal
315 Determining signal strength/location/direction/distance/type
320 Determining position
325 Outputting stop signal
400 Processing system
405 Sensors
410 Detection device
415 Conversion detection
420 Path recognition
425 SLAM (Simultaneous Localization And Matching) determination
430 Obstacle recognition
435 Odometry device
440 Merging
445 GNSS receiver
450 Movement control unit
505 Path
510 Obstacle

The invention claimed is:

1. A system, comprising:
a series of converters arranged along a boundary of an agricultural cultivated area, wherein each converter of the series of converters is configured to emit a second signal in response to an incoming first signal;
an autonomously driving agricultural machine including a transmitting device configured to emit the first signal in an environment of the agricultural machine, a receiving device configured to receive the second signal emitted in response to the first signal by a converter of the series of converters, and a processing device configured to determine a position of the agricultural machine with respect to the boundary based on the received second signal,
wherein an arrangement and/or a conversion characteristic of converters is different at a first section of the boundary than at a second section of the boundary.

2. The system according to claim 1, wherein the conversion characteristic relates to the strength of the second signal in relation to the first signal.

3. The system according to claim 2, wherein the conversion characteristic depends on a type of the first signal.

4. The system according to claim 1, wherein the arrangement relates to a distance of a converter from an adjacent converter.

5. The system according to claim 1, wherein the arrangement relates to a vertical height of a converter.

6. The system according to claim 1, wherein a plurality of converters are arranged to be vertically offset at at least one location along the boundary.

7. The system according to claim 1, wherein both signals include electromagnetic waves corresponding to one another, and the converter is designed as a reflector.

8. The system according to claim 1, wherein both signals include different electromagnetic waves, and the converter is designed as a transponder.

9. A method for determining a position of an agricultural machine with respect to a boundary of an agricultural cultivated area, comprising:
   arranging a series of converters along the boundary of the agricultural cultivated area, wherein each converter of the series of converters is configured to emit a second signal in response to an incoming first signal;
   emitting at least one first signal in an environment of the agricultural machine;
   receiving at least one second signal emitted in response to the at least one first signal; and
   determining the position of the agricultural machine based on the at least one received second signal.

10. A control device for an agricultural machine, which is configured to autonomously drive on an agricultural cultivated area, the control device comprising:
   a transmitting device configured to emit at least one first signal in an environment of the agricultural machine toward one or more converters of a series of converters arranged along a boundary of the agricultural cultivated area, each of the series of converters being configured to receive the at least one first signal and emit a second signal in response thereto;
   a receiving device configured to receive a plurality of second signals that have been emitted in response to the at least one first signal;
   a memory device configured to store positions of the one or more converters of the first signal in the second signal along the boundary of the cultivated area; and
   a processing device configured to determine a position of the agricultural machine with respect to the boundary based on one or more of the plurality of received second signals.

11. An agricultural machine, comprising a control device according to claim 10, wherein the agricultural machine is configured to determine an impending crossing of the boundary based on its determined position.

* * * * *